(No Model.)
W. R. PATTERSON.
CONDUIT FOR TELEGRAPH CABLES.
No. 433,025. Patented July 29, 1890.
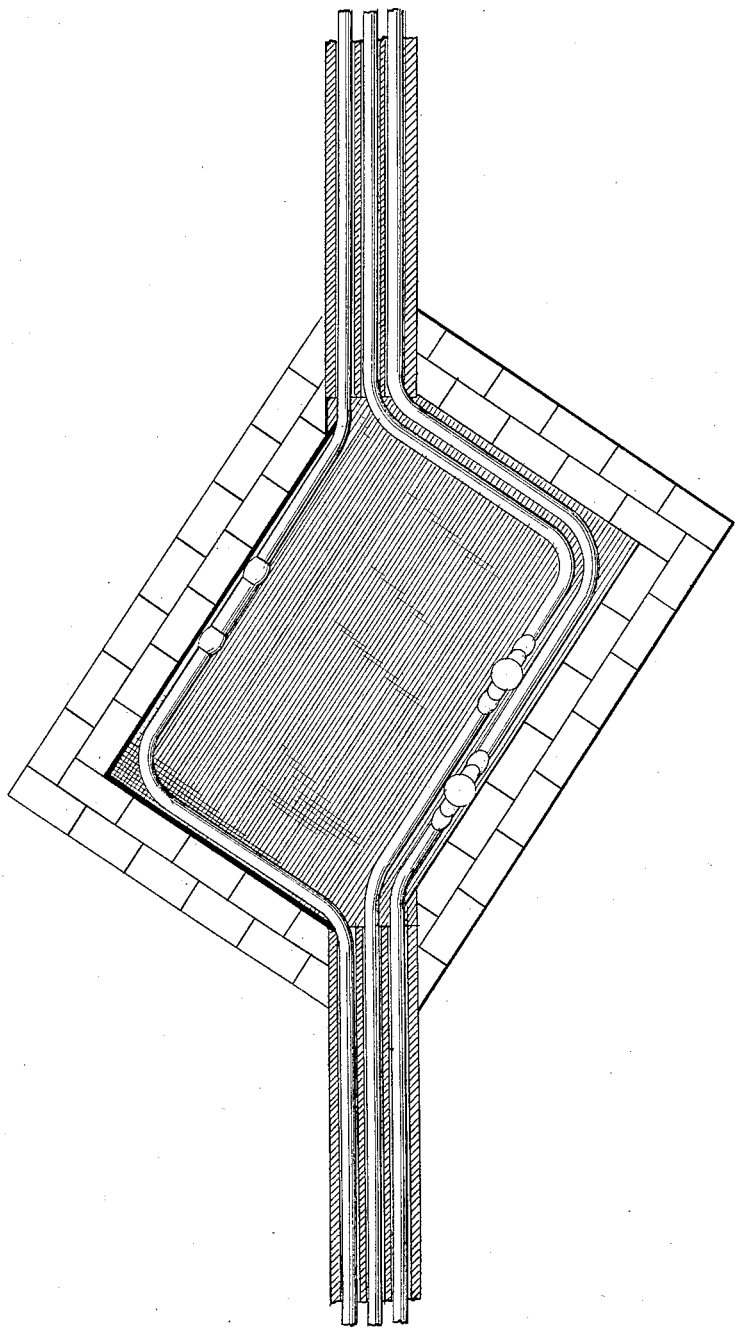
Witnesses:
Sam'l B. Dover.
W^m M. Giller.
Inventor.
William R. Patterson
by George P. Barton
attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

CONDUIT FOR TELEGRAPH-CABLES.

SPECIFICATION forming part of Letters Patent No. 433,025, dated July 29, 1890.

Application filed July 18, 1887. Serial No. 244,598. (No model.)

*To all whom it may concern:*

Be it known that I, WILLIAM R. PATTERSON, a citizen of the United States, residing at Chicago, in the county of Cook and State of Illinois, have invented a certain new and useful Improvement in Conduits for Telegraph-Cables, (Case 69,) of which the following is a full, clear, concise, and exact description, reference being had to the accompanying drawing, forming a part of this specification.

My invention relates to conduits for underground electric conductors, and more especially to the manner of placing the man-holes with respect to the direction of the conduits. Heretofore the man-holes have been generally square or circular in horizontal section and the conduits have entered at opposite sides. It is necessary that the central portion of the man-hole should be left open, and hence the cables, in passing from the conduits on one side to the other, must be bent to conform to the interior sides or walls of the man-holes. In case of rectangular man-holes having conduits entering at opposite sides, as heretofore, the cable must, in order to do this, be bent three hundred and sixty degrees—that is to say, four bends of ninety degrees each have been necessary. Man-holes of cylindrical form are not desirable, especially on account of the difficulty of making splices in the semicircular bends, which are necessarily made in the cables in order to make them conform to the sides of such man-holes.

My invention is designed to avoid the necessity of excessively bending the cables at the man-holes, while at the same time ample room is afforded for splicing the cables.

My invention consists in providing rectangular man-holes, which are placed so that diagonally-opposite corners will be in line with the conduits. The cable, in following the sides from one corner to the other, is bent only one hundred and eighty degrees—that is to say, there are three bends necessary, first, forty-five degrees, then at the corner ninety degrees, and lastly, as the cable goes out, forty-five degrees.

My invention is illustrated in the accompanying drawing, in which I have shown a man-hole rectangular in form, with the conduits entering at diametrically-opposite corners thereof.

It will be seen that the cables may be arranged upon the different sides, so as to leave the central portion of the man-hole open, and that it is only necessary to bend the cables one hundred and eighty degrees in passing through the man-hole, while at the different sides the cable is left straight for quite a distance, so that ample room is provided for sleeve-splices, Y-splices, or other connections.

I preferably make the man-hole rectangular and oblong, as shown, so that ample room may be afforded for splices and terminals on the longer sides.

It is evident that the man-hole might be made triangular instead of rectangular without departing from my invention.

Having thus described my invention, I claim as new and desire to secure by Letters Patent—

1. The combination, with the angular man-hole of an underground electric cable system, of conduits connected with the man-hole at opposite angles and cables laid in said conduits and bent to conform to the sides of the man-hole, whereby space is afforded for splices on opposite sides and all unnecessary bending of the cable avoided, substantially as shown and described.

2. The combination, with the angular man-hole with plane sides, of a conduit connected with opposite angles thereof, and a cable laid in said conduit and conforming to the sides of the man-hole, whereby the cable is bent less than ninety degrees on entering the conduit at each angle.

In witness whereof I hereunto subscribe my name this 7th day of May, A. D. 1887.

WILLIAM R. PATTERSON.

Witnesses:
GEORGE P. BARTON,
WM. M. GILLER.